March 29, 1960    H. A. RIESTER, JR., ET AL    2,930,362
PNEUMATIC CLOCK CONTROLLED MOTOR Filed Dec. 3, 1956      2 Sheets-Sheet 1

Hubert A. Riester Jr.
Carl J. Kugler INVENTORS

BY Ralph Hammar
ATTORNEY

United States Patent Office 2,930,362
Patented Mar. 29, 1960

2,930,362

PNEUMATIC CLOCK CONTROLLED MOTOR

Hubert A. Riester, Jr., and Carl J. Kugler, Philadelphia, Pa., assignors to American Meter Company, Incorporated, Philadelphia, Pa., a corporation of Delaware Application December 3, 1956, Serial No. 625,813

13 Claims. (Cl. 121—48).

This invention is a pneumatic motor having an escapement controlled flapper which controls the number of pulses to a pneumatic cylinder. By sizing the piston and magnitude of the pneumatic pressure, the power output can be varied over a wide range. In addition, the number of pulses can be changed to cause the output to have a wide range of speeds. Both the power cylinder and escapement are combined into a single unit permitting the output of the device to rewind the mainspring in the escapement for continuous operation. A hermetic seal permits the transmission of power out either or both ends of the cylinder. One use of such motors is for driving the charts of recording instruments used to measure the flow of gas. There the pressure of the gas which is being measured can be used to operate the motor.

Figure 1:
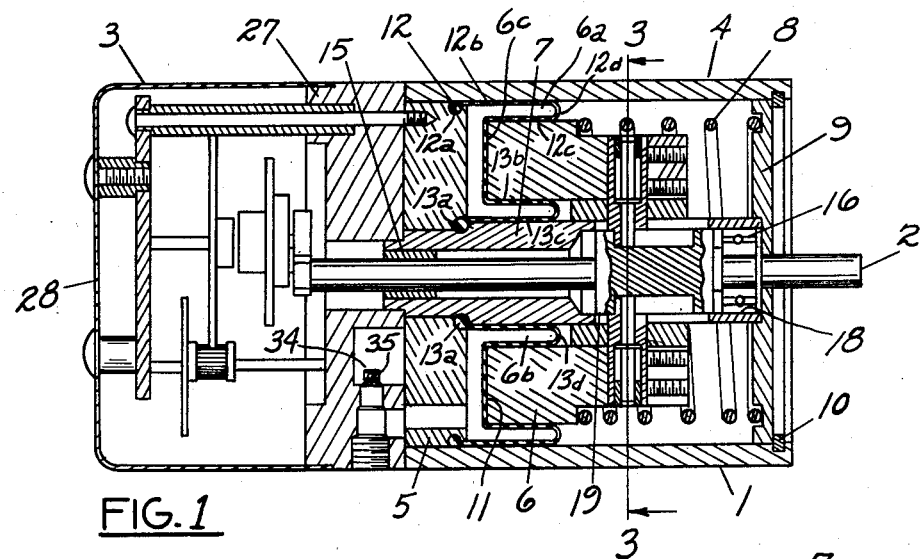
Figure 2:
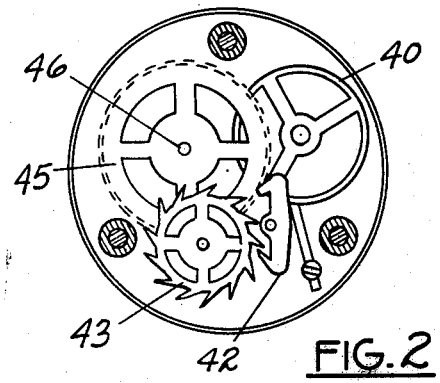
Figure 3:
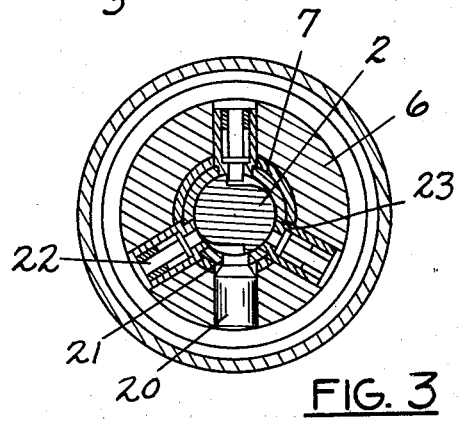
Figure 8:
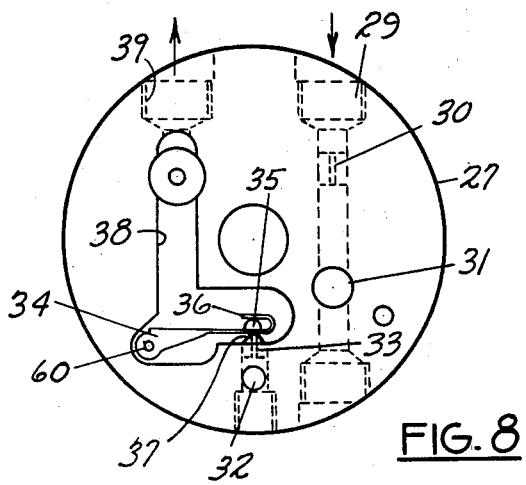
Figure 4:
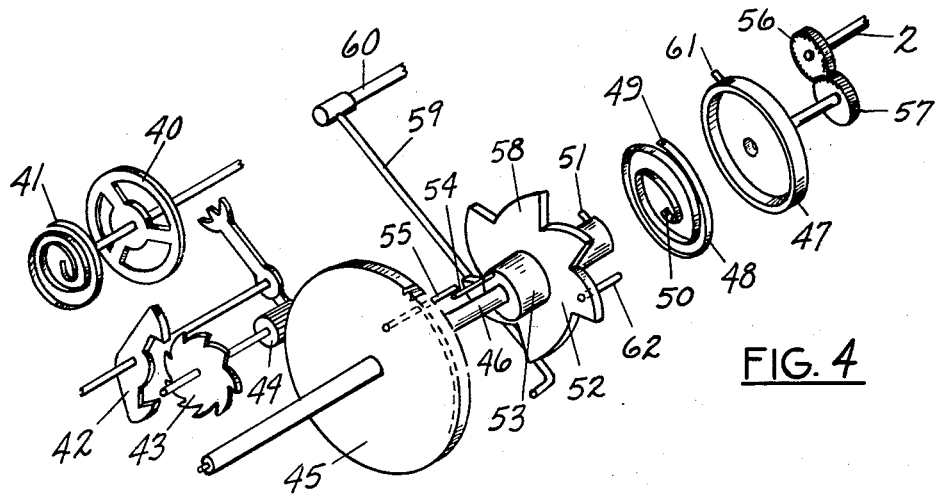
Figure 5:
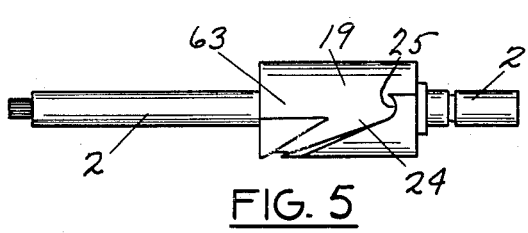
Figure 7:
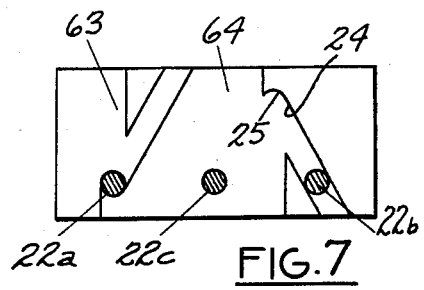
Figure 9:
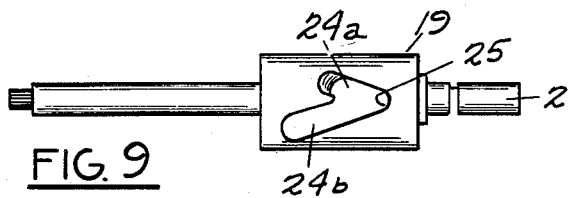
Figure 6:
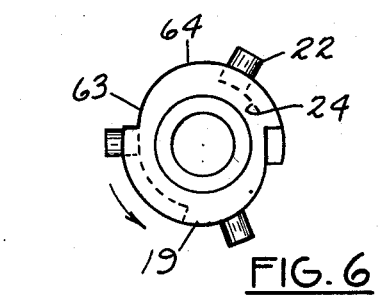
Figure 10:
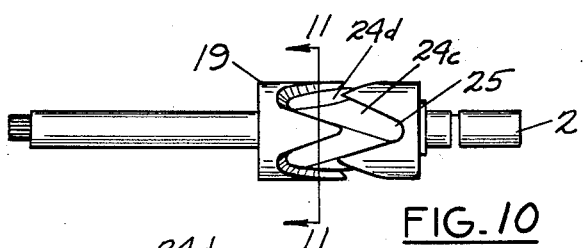
Figure 11:
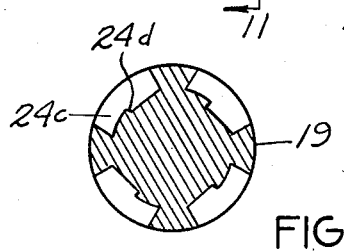

In the drawing, Fig. 1 is a longitudinal section of the motor; Fig. 2 is an end view with the cover removed; Fig. 3 is a section on line 3—3 of Fig. 1; Fig. 4 is a distorted perspective of the escapement and associated control; Fig. 5 is a detail of the output shaft; Fig. 6 is an end view showing the drive from the piston to the output shaft; Fig. 7 is a developed view of the cams in the output shaft; Fig. 8 is an end view of the base plate of the escapement; Fig. 9 is a side view of the output shaft with a modification of the cam grooves; Fig. 10 is a side view of the output shaft with another modification of the cam grooves; and Fig. 11 is a section on line 11—11 of Fig. 10.

The motor consists generally of a pneumatic motor 1 at the right in Fig. 1 for driving an output shaft 2 and an escapement 3 at the left in Fig. 1 for controlling the rate of drive of the output shaft.

The pneumatic motor has a cylinder 4 closed at one end by a cylinder head 5 and surrounding an annular piston 6. The piston is guided on a center post 7 fixed to the cylinder head and is urged to the left as viewed in Fig. 1 by a coil spring 8 arranged between the piston and an end plate 9 suitably fixed in the end of the cylinder, for example, by a snap ring 10. There is an annular space or gap 6a between the piston and the cylinder and a similar annular space or gap 6b between the piston and the center post. The seal between the piston and the cylinder is effected by an annular cup-shaped diaphragm 11 of flexible material such as rubber or fabric and having both its outer rim 12 and its inner rim 13 in the form of an O-ring. The rim 12 fits in a groove 12a in the cylinder head 5 adjacent the cylinder 4 and the rim 13 is clamped between the cylinder head and a shoulder 13a on the center post. When installed, the diaphragm is hermetically sealed to the cylinder and to the center post and the walls of the diaphragm cover the end 6c of the piston and line the annular spaces 6a and 6b between the piston and the cylinder 4 and the center post 7. In all positions of the piston, the part of the diaphragm in contact with the end 6c of the piston does not move relative to the piston and may even be cemented or otherwise fixed to the piston. The maximum stroke of the piston is such that there is always an annular reentrant section of the diaphragm having spaced walls 12b and 12c in contact with the cylinder and piston and connected by an annular loop 12d and having spaced walls 13b and 13c in contact with the piston and center post and connected by an annular loop 13d. The spaces between the piston and the cylinder and center post are greater than the combined thickness of the walls 12b and 12c or 13b and 13c. The annular loops 12d and 13d are semi-circular in radial cross-section and form bridging connections between the walls 12b and 12c and 13b and 13c. As the piston reciprocates, there is a rolling action at the loops 12d and 13d which remain of the same configuration while the axial length of the walls 12b, 12c, 13b, 13c, changes to accommodate the relative movement between the piston and cylinder. When gas under pressure is admitted between the diaphragm 11 and the cylinder head 5, the piston 6 is forced to the right as viewed in Fig. 1 overcoming the spring 8. When gas is vented from the space between the cylinder head and diaphragm, the spring 8 moves the piston to the left as viewed in Fig. 1. It will be noted that the greater part of the walls of the diaphragm subject to fluid pressure are supported by the piston and cylinder and that only the annular loops 12d and 13d are unsupported. While these loops have thin walls, the span is so short that the ability to withstand pressure is much greater than would be expected of such thin walls. It should also be noted that there is a complete hermetic seal between the diaphragm and the cylinder and center post so that any operating parts within the center post can extend out or act through either or both ends of the center post without interfering with the seal.

At the center of the center post 7 is the output shaft 2 journaled at its lefthand end in a sleeve bearing 15 and its righthand end in a ball bearing 16 which takes the end thrust. The output shaft 2 transmits power through both ends of the center post. At the righthand end, the center post 7 has an enlarged cylindrical bore 18 within which an enlarged section 19 of the output shaft 2 turns. The piston 6 is kept from turning by a pin 20 which fits in a longitudinal slot 21 in the center post. In order to obtain a rotary motion of the output shaft 2 from the reciprocating movement of the piston 6, there are three spring pressed pins 22 carried by the piston which project through axial clearance slots 23 in the center post 7 and cooperate with spiral cam grooves 24 in the enlarged section 19 of the output shaft 2. The cam grooves 24 terminate in stops 25 which positively limit the stroke of the piston in both directions. Upon each stroke of the piston, the output shaft is cammed through an arc which depends upon the design of the cams, for the particular cam illustrated in Figs. 5–7, the shaft turns 60° for each stroke of the piston. Since the reciprocation of the piston is controlled as hereinafter described so as to have twelve strokes a minute, the output shaft rotates at the rate of two complete revolutions per minute. The rotation of the output shaft is not continuous but is a step by step motion. Both the forward and backward strokes of the piston are relatively fast so that upon each stroke of the piston, the output shaft quickly moves through an arc of 60° and then waits for the succeeding stroke of the piston when the 60° movement is again repeated.

It will be noted that although there are three pins 22, only one of the pins at a time is effective for driving. In Fig. 7, the pin 22a has just completed its driving stroke and the pin 22b has dropped into driving position. The pin 22c is riding on the smooth periphery of the enlarged section 19 of the shaft. Viewed from the end, the cam grooves 24 function as a ratchet to prevent backward rotation of the shaft. The ratchet action is apparent from Fig. 6 where it can be seen that the shaft can turn in the direction of the arrow but cannot turn in the reverse direction. The ratchet action is also apparent from Fig. 7, where it can be seen that as the pins 22a, 22b and 22c are moved upward with the piston, the developed view of the shaft must move to the right and cannot move to the left because the cam grooves are oppositely inclined. The ratchet action comes into play at the end of each stroke of the piston. At the end of the stroke, a pin drops into an oppositely inclined groove and prevents reverse movement of the piston.

The control of the reciprocation of the piston is effected by the escapement 3 at the left in Fig. 1. The escapement is mounted on a base plate or frame 27 enclosed by a cover 28. The gas for actuating the piston is supplied through an inlet fitting 29 in the base and flows through a restriction 30 into a passageway 31 leading to the space between the cylinder head 5 and the diaphragm 11. Gas can flow out of the space between the piston head and the diaphragm through a passageway 32 leading to a restricted orifice 33 controlled by a flapper 34. The control of the orifice is effected by a sapphire ball 35 loosely carried between the flapper 34 and a folded over portion 36. In the lower position shown in Fig. 8, the ball 35 rests on and completely seals the orifice 33. The orifice 33 is of greater diameter than the restriction 30 so that when the ball 35 is unseated from the orifice 33, the gas bleeds from the space between the piston head 5 and the diaphragm 11 and the spring 8 forces the piston to the left. When the ball 35 is seated on the orifice 33, the gas pressure builds up between the cylinder head 5 and the diaphragm 11 and forces the piston to the right against the pressure of the spring 8. Accordingly, the flapper 34 provides a positive control for the stroke of the piston. When the flapper 34 closes the orifice 33, the piston is moved to the right as viewed in Fig. 1 by the gas pressure. When the flapper opens the orifice 33, the gas pressure which has built up between the piston and cylinder head is bled through the orifice and the piston is moved to the left as viewed in Fig. 1 by the spring 8. The gas which bleeds through the orifice 33 is discharged through a passageway 38 leading to an outlet fitting 39. The passageway 38 is on the side of the base 27 adjacent the cylinder head 5 and is sealed so that gas does not have a chance to escape.

The flapper 34 is controlled by an escapement most clearly shown in the exploded perspective of Fig. 4. The conventional parts of the escapement are readily identified, 40 being the balance wheel, 41 the hair spring, 42 the verge, 43 the escapement wheel, 44 the lantern pinion, 45 the minute wheel fixed to a shaft 46, 47 the spring barrel and 48 the main spring. The spring barrel 47 is loose on the shaft 46. The outer end 49 of the main spring is hooked to the barrel 47 and the inner end 50 of the main spring is hooked to a projection 51 on a cam 52 which is also loose on the shaft 46. On the hub 53 of the cam 52 is a drive pin 54 which cooperates with a drive pin in the minute wheel and turns the minute wheel 45 at a rate controlled by the balance wheel and escapement 42—43. When the spring barrel 47 is turned in a counter-clockwise direction, the main spring 48 acts through the projection 51 and exerts a force tending to turn the cam 52 in the same direction. The force exerted by the pin 54 on the pin 55 on the minute wheel 45 likewise tends to turn the minute wheel in a counter-clockwise direction, but the minute wheel can only turn at the controlled rate fixed by the balance wheel and escapement. The turning of the spring barrel 47 is effected by a gear 56 fixed to the output shaft 2 which meshes with a gear 57 of twice the number of teeth fixed to the spring barrel 47. Accordingly, at each 60° step in the rotation of the output shaft 2, the spring barrel 47 is given a 30° advance, the amount determined by the gearing 56—57 and by the number of lift lobes 58 on cam 52, and momentarily increases the tension of the mainspring 48.

The timing of the piston stroke is effected through the six lobed cam 52 which is loose on the shaft 46. The lobes 58 of the cam are spaced 60° apart and cooperate with a crank arm 59 fixed to a shaft 60 to which the flapper 34 is also fixed. Whenever one of the lobes 58 engages the arm 59, the shaft 60 is rocked to a position lifting the flapper 34 off the nozzle 33. When the lobe 58 rides off the arm 59, the flapper drops back onto the nozzle 33. During each revolution of the cam 52, the flapper is accordingly lifted off the nozzle six times and dropped back onto the nozzle six times, thereby providing for twelve 60° steps of rotation of the output shaft 2. The shaft 60 is suitably sealed with an O ring preventing gas from chamber 38 entering the escapement unit.

Before assembly, the main spring 48 is given an initial tension or prewind of approximately three turns of the spring barrel. This amount of tension is kept in the mainspring at all times by a stop 61 on the spring barrel which cooperates with a similar stop 62 on the cam 52 and prevents unwinding of the main spring. When assembled, the drive pins 54 and 55 on the cam and minute wheel are in engagement. In this position, the lever arm 59 is between two lobes 58 on the cam and the flapper is accordingly sealed on the nozzle 33. Since no gas pressure has been applied, the spring 8 has forced the piston 6 to the left as viewed in Fig. 1 although the flapper is in position so that as soon as gas is applied, the piston will be moved to the right. The application of gas pressure and the accompanying movement of the piston turns the spring barrel 47 through a 30° angle by gearing 56—57 and applies an additional 30° of tension to the mainspring 48. The movement of the spring barrel separates the stop pin 61 from the stop pin 62 and permits rotation of the cam 52 by the mainspring 48 at the rate permitted by the escapement. When the cam has turned through an angle somewhat less than 30° and the stop pins 61 and 62 are almost touching, the lever arm 59 lifts the flapper 34 off the nozzle 33 and bleeds the gas pressure acting on the piston so that the spring 8 can force the piston to the left as viewed in Fig. 1 and turn the output shaft 2 through an additional 60° angle. During the operation, the piston turns the output shaft through successive 60° angles and by the same action turns the spring barrel 47 through 30° determined by gearing 56—57. This applies spring tension to the cam 52 which attempts to catch up at a rate controlled by the escapement to the position of the barrel, but never quite making it because of the double rewind initially supplied when the gas is first applied. With this arrangement, the spring is automatically wound at each stroke of the piston and the amount of rewind put in by each stroke is used to spring power the cam 52 which controls the flapper 34. The spring is accordingly kept at quite uniform tension which improves the accuracy of the escapement. It will be noted that there is never any need for winding the mainspring because the mainspring is automatically rewound as part of the operation of the clock.

The clock is very useful for driving the charts of instruments used in measuring the flow of gas. In such instruments, the gas pressure for operating the clock may be obtained from the gas which is being measured and the clock accordingly always runs when there is gas to be measured and stops whenever the supply of gas is cut off. If the supply of gas is shut off, the piston is moved to the left by action of spring 8 and the escapement unwinds until pins 61 and 62 are touching. Here the escapment stops with the flapper 34 on the nozzle 37. Restoration of gas will restart the clock and maintain operation according to the previous description. The chart and the instruments for measuring gas flow are not disclosed because they are well understood in the art.

The output shaft shown in Figs. 5 and 6 is very easy to make. The cam grooves 24 are end milled into the enlarged section 19 of the shaft and a formed cutter mills the inclined ramps 63 leading from the ends 25 of the grooves 24 to the cylindrical sections 64 between the grooves. Both of the milling cuts are easily made.

In Figs. 9 and 10 are shown modifications of the output shaft which have the same mechanical action but are more difficult to machine. In Fig. 9, instead of milling the inclined ramp parallel to the axis of the shaft, the ramp is an end milled groove 24a extending from the stop 25 at terminus of groove 24b and parallel to the next adjacent groove. Each groove 24a in conjunction with the adjoining groove 24b from which it branches forms in effect a V-groove with the longer side of constant depth and the shorter side of gradually decreasing depth. In Figs. 10 and 11, there are continuous V-grooves extending around the complete circumference of the enlarged section 19 of the shaft. Each groove 24c starts from the stop 25 at the end of a preceding groove and extends with gradually decreasing depth until intersection with a succeeding groove. The bottom of each of the grooves 24c provides an inclined ramp and the intersection of the end of one groove with the beginning of the succeeding groove provides a shoulder 24d which prevents reverse rotation of the shaft when the shaft reaches the end of each stroke of the piston. At points short of the end of each stroke, the shaft is reversible which is desirable because it permits the piston to return to its initial position if for any reason conditions (i.e., failure of the fluid pressure) prevent completion of a stroke.

The modification of Fig. 9 can be substituted directly in the motor of Fig. 1 without any change. The modification of Figs. 10 and 11 has a different angle to the cam or grooves (45° instead of 60°) and accordingly requires a change in the drive pins. While theoretically only one drive pin need be used, it is preferable that at least two pins be used so that one pin can be idle and free to drop into driving position. Otherwise, the driving load may keep the driving pin from dropping into the succeeding groove at the end of each stroke. This is accomplished by displacing two of the four pins axially on the piston by about 1/64". These pins for the cam of Figs. 10 and 11 are spaced 90° apart instead of 120° as in Fig. 3 for the cam of Fig. 5.

In all forms of the motor, there is a step by step rotary motion of the output shaft at an average rate controlled by an escapement. The motion of the output shaft is not continuous. The angle of each step is determined by the inclination of the cam grooves, and can be varied over a wide range as is illustrated by the foregoing descriptions. The power output can be made extremely high by sizing the area of the piston and the magnitude of air pressure. It is significant that variations in pressure do not affect the timing rate of the device; only the maximum power output.

What is claimed as new is:

1. A motor comprising a piston, a spring urging the piston in one direction, a fluid pressure supply connected to move the piston in the opposite direction, a nozzle for bleeding fluid pressure to permit movement of the piston by the spring, a flapper for opening and closing the nozzle whereby when the nozzle is closed the fluid pressure builds up and moves the piston in opposition to the spring and when the nozzle is opened the fluid pressure is released and the spring moves the piston, a rotatable cam for successively opening and closing the nozzle, a main spring driving the cam, an escapement controlling the speed of rotation of the cam, a rewind shaft for the main spring, and a mechanism connected between the piston and the rewind shaft for converting the reciprocation of the piston to rotation of the rewind shaft whereby the main spring is kept wound.

2. A motor comprising an annular cylinder having a head at one end, an annular piston in the cylinder, a spring urging the piston toward the head, an output shaft extending through the center of the cylinder, mechanism for converting reciprocation of the piston to rotation of the shaft, a fluid pressure supply passage in the head leading to the space between the piston and head, a bleed passage leading from the space between the piston and head, a discharge nozzle for said bleed passage, a flapper controlling said nozzle whereby when the nozzle is closed the fluid pressure builds up and forces the piston away from the head and when the nozzle is open the fluid pressure drops and the spring moves the piston toward the head, a rotatable cam for moving the flapper to successively open and close the nozzle, a main spring driving the cam, an escapement controlling the speed of rotation of the cam, a rewind shaft for the main spring, and a connection from the output shaft to the rewind shaft for rewinding the main spring in proportion to the rotation of the output shaft.

3. A motor comprising an annular cylinder having a head at one end, a piston on one side of the head, an escapement on the other side of the head, means controlled by the escapement for controlling the reciprocation of the piston, an output shaft extending through the center of the cylinder, mechanism connected between the piston and output shaft for converting reciprocation of the piston to rotation of the output shaft, a main spring for driving the control means, a rewind shaft for the main spring, and a driving connection from the output shaft to the rewind shaft for rewinding the main spring in proportion to the rotation of the output shaft.

4. In a pneumatic chart recording instrument, a pneumatic piston motor having an output shaft for driving the chart, mechanism connected between the piston and shaft for converting reciprocation of the piston to rotation of the shaft, a rotatable cam means controlling the reciprocation of the piston, a main spring driving the cam means, an escapment controlling the speed of rotation of the cam means, a rewind shaft for the main spring and a drive from the output shaft to the rewind shaft for maintaining the main spring wound.

5. In a pneumatic chart recording instrument, a pneumatic motor comprising a piston, a spring urging the piston in one direction, a fluid pressure supply connected to move the piston in the opposite direction, a nozzle for bleeding fluid pressure to permit movement of the piston by the spring, a flapper for opening and closing the nozzle whereby when the nozzle is closed the fluid pressure builds up and moves the piston in opposition to the spring and when the nozzle is opened the fluid pressure is released and the spring moves the piston, a rotatable cam for successively opening and closing the nozzle, a main spring driving the cam, an escapement controlling the speed of rotation of the cam, said motor having an output shaft for driving the chart, mechanism connected between the piston and shaft for converting reciprocation of the piston to rotation of the shaft, and a drive from the output shaft to the rewind shaft for maintaining the main spring wound.

6. In a chart recording instrument, a chart drive motor comprising an annular cylinder having a head at one end, an annular piston on one side of the head, an escapement on the other side of the head, guide means for the reciprocation of the piston, means controlled by the escapement for controlling the reciprocation of the piston, an output shaft for driving the chart extending from said one side of the head through the center of the cylinder to said other side of the head, a center post surrounding the shaft having circumferentially spaced slots, said shaft having circumferentially spaced oppositely inclined cam grooves, said piston having pins projecting through the slots and cooperating with a groove of one inclination upon motion of the piston in one direction and with a groove of opposite inclination upon motion of the piston in the reverse direction to convert reciprocating motion of the piston to rotation of the shaft, a main spring for driving the control means, a rewind shaft for the main spring, and a driving connection from the output shaft to the rewind shaft for rewinding the main spring in proportion to the rotation of the output shaft.

7. In a chart recording instrument, a chart drive motor comprising a cylinder, a piston, guide means for the reciprocation of the piston, an output shaft at the center of the piston for driving the chart, said shaft having circumferentially spaced oppositely inclined cam grooves, said piston having pins cooperating with a groove of one inclination upon motion of the piston in one direction and with a groove of opposite inclination upon motion of the piston in the reverse direction to convert reciprocating motion of the piston to rotation of the shaft, an escapement for controlling the reciprocation of the piston, a main spring for driving the escapement, a rewind shaft for the main spring, and a driving connection from the output shaft to the rewind shaft for rewinding the main spring.

8. In a pneumatic chart recording instrument, a pneumatic piston motor having an output shaft for driving the chart, a rotatable cam means controlling the reciprocation of the piston, a main spring driving the cam means, an escapement controlling the speed of rotation of the cam means, a rewind shaft for the main spring and a drive from the output shaft to the rewind shaft for maintaining the main spring wound.

9. A chart drive motor comprising a cylinder, a piston, guide means for the reciprocation of the piston, an escapement, means controlled by the escapement for controlling the reciprocation of the piston, an output shaft at the center of the piston, a center post surrounding the shaft having slots, said shaft having circumferentially spaced oppositely inclined cam grooves, a plurality of spring pressed pins on the piston arranged to cooperate in sequence with a groove of one inclination upon motion of the piston in one direction and with a groove of opposite inclination upon motion of the piston in the reverse direction to convert reciprocating motion of the piston to rotation of the shaft, an inclined ramp guiding a non-driving pin to its driving position, a shoulder cooperating with said non-driving pin for preventing reverse rotation of the shaft as said non-driving pin reaches its driving position, a main spring for driving the escapement, a rewind shaft for the main spring, and a driving connection from the output shaft to the rewind shaft for rewinding the main spring.

10. A chart drive motor comprising a cylinder, a piston, guide means for the reciprocation of the piston, an escapement, means controlled by the escapement for controlling the reciprocation of the piston, an output shaft, said shaft having circumferentially spaced oppositely inclined cam grooves, a plurality of spring pressed pins on the piston arranged to cooperate in sequence with a groove of one inclination upon motion of the piston in one direction and with a groove of opposite inclination upon motion of the piston in the reverse direction to convert reciprocating motion of the piston to rotation of the shaft, an inclined ramp guiding a non-driving pin to its driving position, a shoulder cooperating with said nondriving pin for preventing reverse rotation of the shaft as said non-driving pin reaches its driving position, a main spring for driving the escapement, a rewind shaft for the main spring, and a driving connection from the output shaft to the rewind shaft for rewinding the main spring.

11. A chart drive motor comprising a cylinder, a piston, guide means for the reciprocation of the piston, an escapement, means controlled by the escapement for controlling the reciprocation of the piston, an output shaft, a plurality of circumferentially spaced pins in the piston, one of the pins cooperating with one of the grooves to drive the shaft in one direction upon motion of the piston in one direction, another of the pins riding on the shaft in position to drop into an oppositely inclined groove upon motion of the piston in the opposite direction, a main spring for driving the escapement, a rewind shaft for the main spring, and a driving connection from the output shaft to the rewind shaft for rewinding the main spring.

12. A motor comprising an annular cylinder having a head at one end, an annular piston on one side of the head, an escapement on the other side of the head, guide means for the reciprocation of the piston, means controlled by the escapement for controlling the reciprocation of the piston, an output shaft extending from said one side of the head through the center of the cylinder to said other side of the head, means for converting the reciprocation of the piston to rotation of the shaft, a main spring for driving the control means, a rewind shaft for the main spring, and a driving connection from the output shaft to the rewind shaft for rewinding the main spring in proportion to the rotation of the output shaft.

13. A reciprocable motor having a pneumatic piston and an output shaft, means for converting the reciprocation of the piston to rotation of the shaft, a rotatable cam means controlling the reciprocation of the piston, a main spring driving the cam means, an escapement controlling the speed of rotation of the cam means, a rewind shaft for the main spring, and a drive from the output shaft to the rewind shaft for maintaining the main spring wound.

References Cited in the file of this patent

UNITED STATES PATENTS

| | | |
|---|---|---|
| 465,100 | Rice | Dec. 15, 1891 |
| 771,864 | Eager | Oct. 11, 1904 |
| 850,953 | McDowell | Apr. 23, 1907 |
| 1,369,256 | Mackle | Feb. 22, 1921 |
| 1,781,190 | Nilson et al. | Nov. 11, 1930 |
| 2,702,023 | Seeloff | Feb. 15, 1955 |
| 2,718,878 | Du Bois | Sept. 27, 1955 |
| 2,731,534 | Hansen et al. | Jan. 17, 1956 |
| 2,736,629 | Smith | Feb. 28, 1956 |

FOREIGN PATENTS

| | | |
|---|---|---|
| 863 | Great Britain | 1862 |
| 1,041,366 | France | May 27, 1953 |